United States Patent [19]

Baron et al.

[11] 4,448,950
[45] May 15, 1984

[54] POLYCARBONATE HAVING IMPROVED CRITICAL THICKNESS

[75] Inventors: Arthur L. Baron, New Martinsville, W. Va.; Parameswar Sivaramakrishnan, Pittsburgh, Pa.

[73] Assignee: Mobay Chemical Corporation, Pittsburgh, Pa.

[21] Appl. No.: 178,069

[22] Filed: Aug. 14, 1980

Related U.S. Application Data

[63] Continuation of Ser. No. 872,393, Jan. 25, 1978, abandoned, which is a continuation-in-part of Ser. No. 767,607, Feb. 10, 1977, abandoned, which is a continuation-in-part of Ser. No. 687,490, May 18, 1976, abandoned.

[51] Int. Cl.³ .................... C08G 8/02; C08G 63/62
[52] U.S. Cl. .................... 528/128; 528/171; 528/174; 528/199; 528/202; 528/204
[58] Field of Search ............... 260/463; 528/128, 171, 528/174, 196, 198, 202, 199, 204

[56] References Cited

U.S. PATENT DOCUMENTS

| | | | |
|---|---|---|---|
| 3,023,101 | 2/1962 | Ossenbrunner | 260/47 XA |
| 3,250,744 | 5/1966 | Schnell et al. | 260/47 |
| 3,398,212 | 8/1968 | Jackson et al. | 260/47 XA |
| 3,437,631 | 4/1969 | Cleveland | 260/37 PC |

OTHER PUBLICATIONS

O. V. Shirnova et al., Polycarbonates & Mixed Polycarbonates Based on Di-(4-Hydroxyphenyl)Sulphide, 1968, (pp. 111-118), D. I. Mendeleyev Moscow Chemical and Technological Institute.

Primary Examiner—Theodore E. Pertilla
Attorney, Agent, or Firm—Gene Harsh; Lawrence S. Pope; Thomas W. Roy

[57] ABSTRACT

Polycarbonates are provided having improved critical thickness values based on an aromatic diphenol preferably bisphenol A and an aromatic diphenol thioether. By incorporating 2 up to 20 mole percent of the aromatic diphenol thioether based on the total diphenol content into the polymer, the critical thickness of the article molded from the polycarbonate is substantially improved.

10 Claims, No Drawings

POLYCARBONATE HAVING IMPROVED CRITICAL THICKNESS

This application is a continuation of application Ser. No. 872,393, filed Jan. 25, 1978 which is a continuation-in-part of our copending application Ser. No. 767,607, filed Feb. 10, 1977, which is a continuation-in-part of application Ser. No. 687,490, filed May 18, 1976 all now abandoned.

BACKGROUND OF THE INVENTION

1. Field of the Invention

This invention relates to polycarbonate copolymers and more particularly to polycarbonate copolymers having improved critical thickness values.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded articles where impact strength, rigidity, toughness, thermal and dimensional stability as well as excellent electrical properties are required.

However, one deficiency of polycarbonate when used in molded articles is the low critical thickness values of the polycarbonate polymer.

It is known that polycarbonate plastics exhibit high notched Izod (ASTM test D-256) impact values. This value, however, is dependent upon the thickness of the test specimen. Typical notched Izod impact values for a $\frac{1}{8}''$ specimen are about 16 ft.-lbs. per in. These high Izod values result because specimens of $\frac{1}{8}''$ thickness are thinner than the critical thickness of the polymer and therefore upon impact a hinged or ductile break occurs. On the other hand, $\frac{1}{4}''$ specimens exhibit a clean or brittle break and give notched Izod impact values of only about 2.5 ft.-lbs. per in. The $\frac{1}{4}''$ specimens are said to be above the critical thickness of the polymer. "Critical thickness" has been defined as the thickness at which a discontinuity in Izod impact values occurs. In other words, it is the thickness at which a transition from a brittle to a ductile break or vice versa occurs. Thus a standard impact specimen of polycarbonate polymer thicker than the critical thickness exhibits brittle breaks and those thinner than the critical thickness exhibit hinged or ductile breaks. Further, a polycarbonate based on bisphenol A with a melt flow of 3 to 6 grams/10 minutes at 300° C. (ASTM D1238) has a critical thickness of 225 mils.

One approach to solving the critical thickness problem has been to incorporate polyolefin polymers into the polycarbonate which has substantially improved critical thickness (See U.S. Pat. No. 3,437,631). But along with this improvement have come detrimental effects such as colorant dispersion problems because of the diversity of chemical composition of the two component system and also a lack of transparency since the polyolefin and polycarbonate are incompatible.

Thus in accordance with the invention a polycarbonate is provided which has improved critical thickness values and is highly transparent.

BRIEF DESCRIPTION OF THE INVENTION

A copolycarbonate having improved critical thickness is provided which contains from 2 up to 20, preferably from 2-19, and most preferably from 2 to 15 mole percent of the repeating structural unit

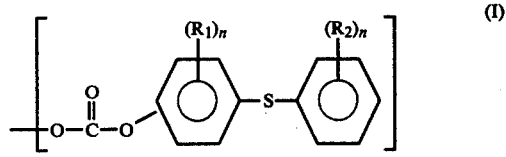

wherein $R_1$ and $R_2$ are hydrogen, lower alkyl groups having 1 to 4 carbon atoms, or halogen, preferably Br or Cl, and n equals 0 to 2, and from greater than 80 to 98, preferably from 81 to 98, and most preferably from 85–98 mole percent of the repeating structural unit

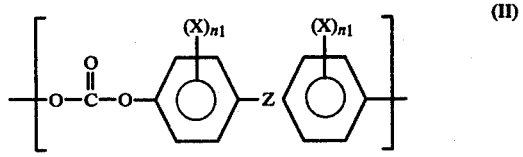

wherein X is hydrogen, a $C_1$ to $C_4$ alkyl radical or a halogen, preferably Br or Cl, most preferably wherein X is hydrogen or a $C_1$–$C_4$ alkyl radical; and $n_1$ equals 1 or 2 and z is a single bond, an alkylene or alkylidene radical with 1 to 7 carbon atoms, a cycloalkylene or cycloalkylidene radical with 5 to 12 carbon atoms, —O—, —CO—, —SO— or —$SO_2$—, preferably methylene or isopropylidene.

DETAILED DESCRIPTION OF THE INVENTION

When used herein "copolycarbonate resin" means the neat resin without additives; "polycarbonate" means the copolycarbonte resin with additives therein.

The copolycarbonate resins of the invention may be prepared by conventional methods for polycarbonate resins, and may have a weight average molecular weight of 10,000 to 200,000 and preferably a melt flow rate of 1 to 24 gram/10 min at 300° C. (ASTM 1238).

Any suitable processes, reactants, catalysts, solvents, and conditions and the like for the production of the polycarbonate resins of this invention which are customarily employed in polycarbonate resin syntheses may be used such as disclosed in German Patent Nos. 1,046,311 and 962,274; U.S. Pat. Nos. 3,028,365, 2,999,846, 3,248,414, 3,153,008, 3,215,668, 3,187,065, 2,964,974, 2,970,137, 2,991,273, and 2,999,835 all incorporated herein by reference. The preferred process is the interfacial polycondensation process.

According to the interfacial polycondensation process, copolycarbonate resins are obtained by reacting the bisphenols represented by the structural formulae:

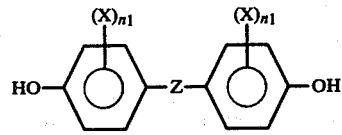

wherein X is hydrogen, a $C_1$ to $C_4$ alkyl radical, or a halogen; preferably Br or Cl, most preferably wherein X is hydrogen or a $C_1$–$C_4$ alkyl radical; and $n_1$ equals 1 or 2 and wherein Z is a single bond, an alkylene or alkylidene radical with 1 to 7 carbon atoms, a cycloalkylene or cycloalkylidene radical with 5 to 12 carbon atoms, —O—, —CO—, —SO— or —SO$_2$—, preferably methylene or isopropylidene and

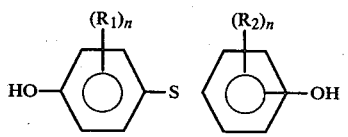

wherein R$_1$ and R$_2$ are hydrogen, lower alkyl groups having 1 to 4 carbon atoms, or halogen, preferably Br or Cl, with an alkaline earth metal oxide or hydroxide or alkali metal hydroxide to form the alkaline earth metal or alkali metal salt of the bisphenols. The salt mixture is present in an aqueous solution or suspension and is reacted with phosgene, carbonyl bromide, or bischloroformic esters of the diphenols. An organic solvent is provided in the reaction admixture which is a solvent for the polymer but not for the phenolic salts hereinbefore described. Thus, chlorinated aliphatic hydrocarbons or chlorinated aromatic hydrocarbons may be used as the organic solvent which dissolves the condensation product.

In order to limit the molecular weight one may use monofunctional reactants such as monophenols, for example, the propyl-, isopropyl- and butyl-phenols, especially p-tert.-butyl-phenol and phenol itself. In order to accelerate the reaction, catalysts such as tertiary amines, quaternary ammonium, phosphonium or arsonium salts and the like may be used. The reaction temperature should be about $-20°$ to $+150°$ C., preferably 0° C. to about 100° C.

According to the polycondensation process in a homogeneous phase, the dissolved reaction components are polycondensed in an inert solvent in the presence of an equivalent amount of a tertiary amine base required for absorption of the generated HCl, such as e.g. N,N-dimethyl-aniline, N,N-dimethyl-cyclohexylamine or preferably pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds, and the monohydroxy compounds in the form of the alkali metal salts and/or bis-haloformic acid esters, and the amount of phosgene or carbonyl bromide then still required in order to obtain high-molecular products. Other methods of synthesis in forming the polycarbonates of the invention such as disclosed in U.S. Pat. No. 3,912,688, incorporated herein by reference, may be used.

The two diphenols necessary for synthesizing the repeating structural units (I) and (II) are thiodiphenol and preferably 4,4'-thiodiphenol and a bisphenol preferably having either methlene or isopropylidine linking the two phenol rings. The most preferred bisphenol is bis-2-(4-hydroxyphenyl)-propane; other bisphenols such as bis-(4-hydroxyphenyl)-methane, bis-2-(4-hydroxy-3,5-dimethyl-phenyl) propane and the like may be utilized.

In addition to the 4,4'-thiodiphenol and the bisphenols recited above other di-(monohydroxyaryl)-alkanes may be incorporated in the polymer at low levels (i.e. levels which do not affect critical thickness values).

Exemplary dihydroxy compounds are taught by U.S. Pat. No. 3,028,365 incorporated herein by reference.

As low as 2 mole percent of the 4,4'-thiodiphenol based on the total diphenol shows improved critical thickness values over a conventional bisphenol A while 10 mole percent of 4,4'-thiodiphenol raises the critical thickness value of the polycarbonate to levels equivalent to those blends of bisphenol A polycarbonate with a polyolefin polymer. However, the thiodiphenol based polycarbonate maintains transparency, good colorant dispersability and other properties substantially improved over the polycarbonate polyolefin blend.

Although copolymers of bisphenols and thiodiphenols are known (See U.S. Pat. No. 3,250,744), the contemplated use of these polymers of the prior art were as coatings and moldings having good anchorage. The copolymers of the prior art have from 20 to 100 mole percent of the repeating structural unit

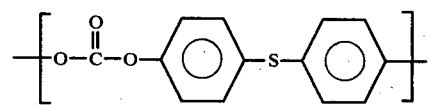

to obtain good anchorage but the prior art did not recognize the improved critical thickness values obtained with the above structural unit from 2 to up to 20 mole percent in the polymer.

The invention will be further described by illustration in the following examples.

EXAMPLES

Example 1

A copolycarbonate resin was prepared by reacting a mixture of the disodium salts of bis-2-(4-hydroxyphenyl)-propane (bisphenol A) and 4,4'-thiodiphenol with phosgene in accordance with the interfacial polycondensation synthesis hereinbefore discussed. The ratio of bisphenol A to 4,4'-thiodiphenol was 9 to 1. The copolycarbonate was tested for physical, mechanical, and optical properties with the test results reported on Table I. The copolycarbonate was found to be highly transparent. Also Table II shows the effect of over aging at 105° C. on impact and critical thickness properties.

EXAMPLE II

Example I was repeated except the mole ratio of 4,4'-thiodiphenol:bisphenol A was 2:98. The copolycarbonate was found to be highly transparent. Test results of Example II and the following Examples are reported on Tables I and II.

Example III

Example II was repeated except the mole ratio of 4,4'-thiodiphenol:bisphenol A was 15:85. As evidenced in Tables I and II, resins of this type surprisingly exhibit critical thickness values in excess of 255 mils even at higher melt indices where one would quite naturally expect the lower molecular weights to dramatically affect the critical thickness value. The copolycarbonate was found to be highly transparent.

The aging data presented in Table II suggests that the resin at that temperature (110° C.) and melt index is more susceptible to hydrolysis upon aging than are the other samples. The small variation in temperature exerts a negligible effect on the comparison.

Example IV

Example IV is a bisphenol A polycarbonate resin having no 4,4'-thiodiphenol therein.

TABLE I

|  | EXAMPLES | | | |
|---|---|---|---|---|
|  | I | II | III | IV |
| Mole % BPA[1] | 90 | 98 | 85 | 100 (Control) |
| Monomers TDP[2] | 10 | 2 | 15 |  |
| Izod[3] (Notched) Impact (Ft. lbs/in) |  |  |  |  |
| ⅛" | 14.89 | 16.0 | 14.9 | 18.44 |
| ¼" | 14.96 | 7.98 | 13.85 | 3.20 |
| Critical Thickness mils | 225 | 247 | >255 | 227 |
| Relative Viscosity[4] | 1.340 | 1.318 | 1.301 | 1.355 |
| Melt Index G/10 min | 2.9 | 3.6 | 6.3 | 3.1 |
| Heat Distortion[5] Temp. °C. | 135 | — | 131 | 134 |
| % s found (calc.) | 1.12(1.32) | 0.24(0.30) | 1.79(1.90) | — |
| Oxygen[6] Index % | 25.4 | — | 25. | 25.5 |
| % Brightness | 87.49 | 86.83 | 88.64 | 86.30 |
| % Haze[7] | 3.2 | — | 1.7 | — |
| Tensile Strength psi | 9000 | — | 8800 | 9800 |
| Ultimate Tensile Strength psi | 9400 | — | 9000 | 10,100 |
| % Elongation | 8 | — | 8 | 8 |
| % Elongation Failure | 90 | — | 100 | 105 |

[1]BPA is Bisphenol A
[2]TDP is 4,4'-thiodiphenol
[3]ASTM D256
[4]0.5 g. resin/100 ml. methylene chloride at 25° C.
[5]°C. under 264 psi load (ASTM-D-648)
[6]ASTM D-2863
[7]ASTM D-1003

TABLE II

| AGING IN AIR AT 105° C. | | | |
|---|---|---|---|
|  | EXAMPLES | | |
|  | I | III(110° C.) | IV |
| Mole % BPA | 90 | 85 | 100 (Control) |
| Monomers TDP | 10 | 15 |  |
| ⅛" Impact (Ft. lbs/in) |  |  |  |
| Unaged | 14.89 | 14.90 | 16.68 |
| 24 hr. | 14.05 | 14.12 | 16.35 |
| 148 hr. | 14.39 | 14.25 | 16.84 |
| 288 hr. | 14.20 | 11.40 | 16.30 |
| Critical Thickness Values |  |  |  |
| Unaged | 255 | >255 | 225 |
| 24 hr. | 199 | 185 | 185 |
| 148 hr. | 170 | 145 | 155 |
| 288 hr. | 170 | 135 | 155 |

As is shown in the data presented in Tables I and II as low as 2 mole % of 4,4'-thiodiphenol based upon the total diphenol content in the polycarbonate resin improves the critical thickness of articles molded therefrom while maintaining substantially equivalent physical and mechanical properties of the conventional bisphenol A based on polycarbonate resin.

Because of the superior impact behavior and improved critical thickness values of BPA-TDP copolymers, one part of the invention involves an investigation of the influence of temperature and notch radius on notched Izod impact strength. The following compositions were included in the comparison:

1. 95/5 BPA-TDP copolymer
2. 85/15 BPA-TDP copolymer
3. 96/4 BPA-polyethylene blend (T 70)
4. BPA homopolymer (melt flow rate=7.6 g/10 min)
5. BPA homopolymer (melt flow rate=4.8 g/10 min)
6. ZYTEL ST—the trademark name for a "supertough" 66 nylon resin manufactured by E. I. du Pont de Nemours and Co.

Results indicate that:

Standard 3.2 mm notched Izod impact strength values for the copolymers a room temperature are somewhat lower than those of comparable melt flow rate homopolymers. The value for the 15% copolymer is similar to that of T-70 (see Table III).

The impact strength of the TDP copolymers under adverse conditions (low temperature and small notch radii) is superior to that of BPA homopolymers, and comparable to T-70.

With a standard 0.254 mm (10 mil) notch radius, the impact strength of the copolymers is 2-3 times greater than that of ZYTEL ST over the broad temperature range from 0° C. to −30° to −40° C. With a 0.127 mm notch radius, the impact strength vs. temperature performance of the copolymers is comparable to that of ZYTEL ST.

TABLE III

SUMMARY OF NOTCHED IZOD IMPACT STRENGTH VS. TEMPERATURE STUDIES

|  |  | Room Temperature Notched Izod Impact Strength @ 3.2 mm, J/M | | Ductile/Brittle Transition Temp., °C. | |
|---|---|---|---|---|---|
| Examples | MFR, g/10 min[1] | .254 mm Notch (STD) | .127 mm Notch | .254 mm Notch (STD) | .127 mm Notch |
| 95/5 BPA/TDP Copolymer | 4.0 | 850 | 820 | −30 | −8 |
| 85/15 BPA/TDP Copolymer | 7.7 | 740 | 670 | −37 | −6 |
| 96/4 BPA/Polyethylene Blend (T-70)[3] | 7.0 | 715 | 625 | −34 | −5 |
| BPA Homopolymer | 7.6 | 850 | (200)[2] | −7 | >23 |
| BPA homopolymer | 4.8 | 930 | (475)[2] | −12 | 23 |

TABLE III-continued
SUMMARY OF NOTCHED IZOD IMPACT STRENGTH VS. TEMPERATURE STUDIES

| Examples | MFR, g/10 min[1] | Room Temperature Notched Izod Impact Strength @ 3.2 mm, J/M | | Ductile/Brittle Transition Temp., °C. | |
|---|---|---|---|---|---|
| | | .254 mm Notch (STD) | .127 mm Notch | .254 mm Notch (STD) | .127 mm Notch |
| ZYTEL ST | — | 880 | 855 | −2 | −3 |

[1]ASTM D 1238 Condition O
[2]( ) mixed ductile and brittle breaks
[3]Compounded on 1¼" Davis-Standard Extruder.

While it has been known to synthesize polycarbonates from sulfur containing diphenols such as 4,4'-sulfonyl diphenol to incorporate the repeating structural unit

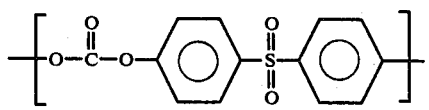

into the polymer such structural units do not improve the critical thickness values of polycarbonates based partially on 4,4'-sulfonyl-diphenol. Table IV shows critical thickness values contrasting 4,4'-sulfonyl-diphenol based polycarbonates with the 4,4'-thiodiphenol based polycarbonates.

TABLE IV

| Monomer Compositions (mole %) | | Critical Thickness mils | Melt Flow (g/10 min.) |
|---|---|---|---|
| *BPA[1] (90) | SDP[2] (10) | 225 | 2.9 |
| BPA (90) | TDP[3] (10) | 255 | 2.9 |
| Random Copolymer | | | |
| BPA (100) | Control | 225 | 3.0 |

[1]Bisphenol A
[2]4,4'-Sulfonyldiphenol
[3]4,4'-Thiodiphenol
*The BPA(90)-SDP(10) copolycarbonate was found to have the following additional properties:

| Heat Distortion Temp at 264 psi, °C. | 147 |
|---|---|
| Impact ft lbs/in (⅛") | 14.80 |
| Impact ft lbs/in (¼") | 3.65 |
| Critical Thickness | 225 |
| Tensile strength, psi | 9300 |
| Ultimate Tensile Strength, psi | 9100 |
| Elongation yield % | 10 |
| Ultimate Elongation % | 95 |

Thus copolycarbonates having a minimum of 2 mole percent of 4,4'-thiodiphenol based upon the total diphenol content in the polymer exhibit improved critical thickness values over conventional polycarbonates and also copolycarbonates based on sulfonyl diphenols.

Although the invention has been described with reference to specific materials and testing procedures the invention is only to be limited in so far as is set forth in the accompanying claims.

What is claimed is:

1. A copolycarbonate resin with a melt flow rate of 1 to 24 gram/10 min. at 300° C. (ASTM 1238) consisting essentially of:

2 up to 15 mole percent of the sulfur containing structural unit

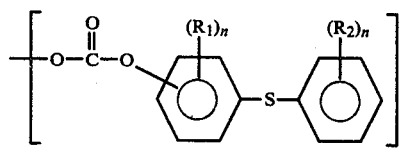

wherein $R_1$ and $R_2$ are hydrogen or lower alkyl groups having 1 to 4 carbon atoms and n equals 0 to 2, and from greater than 85 to 98 mole percent of the structural unit

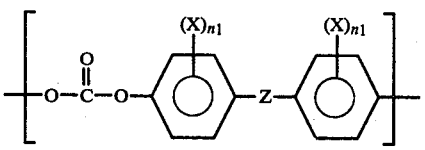

wherein X is hydrogen, a $C_1$ to $C_4$ alkyl radical or a halogen and $n_1$ equals 1 or 2, and Z is a single bond, an alkylene or alkylidene radical with 1 to 7 carbon atoms, a cycloalkylene or cycloalkylidene radical with 5 to 12 carbon atoms, —O—, —CO—, —SO— or —$SO_2$—.

2. The copolycarbonate resin of claim 1 wherein Z is selected from the group consisting of methylene and isopropylidene.

3. The copolycarbonate resin of claim 1 wherein X is selected from the group consisting of hydrogen, a $C_1$-$C_4$ alkyl radical, Br and Cl.

4. The copolycarbonate resin of claim 3 wherein X is selected from the group consisting of hydrogen and a $C_1$-$C_4$ alkyl radical.

5. The copolycarbonate resin of claim 1 wherein the sulfur containing structural unit is:

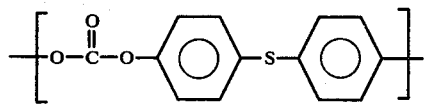

6. The copolycarbonate resin of claim 2 wherein X is hydrogen and Z is isopropylidene.

7. A copolycarbonate resin prepared by a process comprising reacting the ingredients consisting essentially of:

a. thiodiphenol; and
b. a compound of the structural formula

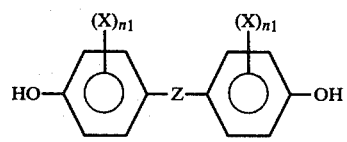

wherein X is hydrogen, a $C_1$ to $C_4$ alkyl group, or a halogen and $n_1$ equals 1 or 2 and Z is a single bond, an alkylene or alkylidene radical with 1 to 7 carbon atoms, a cycloalkylene or cycloalkylidene radical with 5 to 12 carbon atoms, —O—, —CO—, —SO— or —SO$_2$— with a carbonic acid derivative selected from the group consisting of phosgene, carbonyl bromide, the bis-chloroformic esters of (a), and (b) and diaryl carbonates, under conditions selected to produce a copolycarbonate with a melt flow rate of 1 to 24 gram/10 min. at 300° C. (ASTM 1238) wherein (a) is present in the reaction mixture from 2 to 15 mole percent and (b) is present from 85 to 98 mole percent based on the total moles of both (a) and (b).

8. The copolycarbonate of claim 7 wherein the thiodiphenol (a) is 4,4'-thiodiphenol.

9. The copolycarbonate of claim 7 wherein Z is selected from the group consisting of methylene and isopropylidene.

10. The copolycarbonate of claim 7 wherein (b) is bisphenol A.

* * * * *